(12) United States Patent
Hartenstein et al.

(10) Patent No.: US 7,869,830 B2
(45) Date of Patent: Jan. 11, 2011

(54) WIDEBAND ANTENNA SYSTEM

(75) Inventors: Abraham Hartenstein, Chatsworth, CA (US); Alf Friman, Vaxjo (SE); Bob Groppo, Sunnyvale, CA (US); Martin Hakansson, Kalmar (SE); Dennis Lin, Fremont, CA (US)

(73) Assignee: Flextronics AP, LLC, Broomfield, CO (US)

( * ) Notice: Subject to any disclaimer, the term of this patent is extended or adjusted under 35 U.S.C. 154(b) by 856 days.

(21) Appl. No.: 11/609,453

(22) Filed: Dec. 12, 2006

(65) Prior Publication Data

US 2007/0224948 A1 Sep. 27, 2007

Related U.S. Application Data

(60) Provisional application No. 60/749,899, filed on Dec. 12, 2005.

(51) Int. Cl.
*H04M 1/00* (2006.01)

(52) U.S. Cl. .................. 455/562.1; 455/101; 455/550.1; 343/893

(58) Field of Classification Search .................. 455/101, 455/550.1, 561, 562.1; 343/893
See application file for complete search history.

(56) References Cited

U.S. PATENT DOCUMENTS 5,111,213 A    5/1992   Jahoda et al.
5,734,353 A *  3/1998   Van Voorhies ............... 343/742
2002/0025793 A1* 2/2002  Meijer et al. ............. 455/277.1
2003/0219035 A1  11/2003 Schmidt
2004/0213178 A1* 10/2004 Hood, III ..................... 370/328
2005/0052282 A1  3/2005  Rodgers et al.
2005/0107048 A1*  5/2005 Saunders et al. ............ 455/101
2005/0113039 A1*  5/2005 Tsukamoto ................. 455/101
2005/0245207 A1* 11/2005 Suzuki et al. ............... 455/101
2006/0009176 A1*  1/2006 Saunders et al. ............ 455/137

* cited by examiner

*Primary Examiner*—Nhan Le
(74) *Attorney, Agent, or Firm*—Robert G. Crouch; Marsh Fischmann & Breyfogle, LLP (57) ABSTRACT

Generally, an antenna module includes a plurality of monopole antenna elements (e.g., 3 to 4 antenna elements) that can be coupled together by one or more switches to provide for a tunable, wideband antenna module. For example, the switches may change the overall length of the antenna such that the frequency range of the antenna is changed. The frequency response may also be controlled by a low voltage micro sized varicap, or a varactor diode, and instantiated as a tuned, resonant matching filter network residing with the antenna module. Additionally, switches may be used to "switch in" and "switch out" capacitive elements to adjust the bandwidth of the antenna. The resonant matching filter network may then be used for fine tuning the frequency of that bandwidth.

18 Claims, 5 Drawing Sheets

WIDEBAND ANTENNA SYSTEM

CROSS REFERENCE TO RELATED APPLICATIONS

This patent application claims priority to and thus the benefit of an earlier filing date from U.S. Provisional Patent Application No. 60/749,899 (filed Dec. 12, 2005), the entire contents of which are hereby incorporated by reference.

BACKGROUND

Prior communication modules commonly used a single wide band antenna, which required larger form factors for lower frequency band use. For example, the frequency bandwidth for an antenna often depends on the length of the antenna. Generally, there is an inversely proportional relationship between frequency coverage for an antenna and the length of the antenna. In other words, a longer antenna generally provides frequency coverage for lower frequencies whereas a shorter antenna generally provides frequency coverage for higher frequencies. Each distinct antenna length, therefore, typically provides optimum gain at one particular frequency setting.

Generally, when a communication module is configured to communicate across a wide range of frequencies, the antenna must be configured to accommodate lower frequencies and thereby contribute to the bulkiness of the device. Accordingly, prior communication modules themselves are often bulky. Additionally, the antenna typically includes large performance tradeoffs as you move up or down from the optimal frequencies. In this regard, communication at portions in the frequency band far from the optimal frequency provide sub-optimal communications. Moreover, communications across a wide band of frequencies includes a range of unwanted frequencies (e.g. interferers) along with the selected frequency.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems and methods, which are meant to be exemplary and illustrative, and not limiting in scope. In various embodiments, one or more of the above-described problems have been reduced or eliminated, while other embodiments are directed to other improvements.

Generally, systems presented herein provide for a tunable, wideband antenna module. For example, the antenna module may include a plurality of monopole antenna elements (e.g., 3 to 4 antenna elements) that can be coupled together by one or more switches to provide an agile frequency capability for the antenna module. Spherical and dipole antennas may also be used. In this regard, the switches may change the overall length of the antenna such that the frequency characteristics (e.g., bandwidth, optimal reception frequency, etc.) of the antenna are changed. The frequency response may also be controlled by a low voltage micro sized varicap. Such may be instantiated as a tuned, resonant matching filter network residing with the antenna module. Additionally, switches may be used to "switch in" and "switch out" capacitive elements to adjust the bandwidth of the antenna. The resonant matching filter network may then be used for fine tuning the frequency of that bandwidth.

Control of the antenna elements may be implemented with an "off the shelf" circuit for generating PWM and logic signals or with a custom circuit (e.g., a single chip, such as an Application-specific Integrated Circuit, or "ASIC") that may be programmable over a 2-wire interface, such as an $I^2C$ bus, that interfaces with a host system (e.g., a mobile phone processor). Those skilled in the art, however, should readily appreciate that other communication interfaces between a host system may be used. The registers inside the device are typically read/write ("R/W"). The circuit may also include a ROM space to, for example, allow for a unique device ID. Additionally, the circuit may include a microprocessor to control the tuning of the circuit. This, however, should not be interpreted as precluding use of an algorithm in a host system processor, either alone or in part.

In one embodiment, a system for controlling a frequency of operation for a communication device includes an antenna module that includes a plurality of antenna elements and one or more switches configured to selectively couple ones of the antenna elements. The system also includes a controller communicatively coupled to the switch, wherein the controller generates a control signal to control the switch and wherein the switch selectively couples the ones of the antenna elements when directed by the control signal to provide a frequency of operation. The antenna module may include one more antenna element than a total number switches. Alternatively or additionally, the switch may be implemented as a multiplexer.

The system may also include a communication module coupled to the antenna module to communicate via at least one of the plurality of the antenna elements. In this regard, the controller may be configured with the communication module. Additionally, the controller may include a software module that directs a microprocessor to generate the control signal.

In another embodiment, a portable communication device includes a first antenna module that includes a plurality of antenna elements. The portable communication device also includes a receiver communicatively coupled to the first antenna module to receive a first signal via the first antenna module. Additionally, the portable communication device includes a controller that monitors a signal quality of the first signal, wherein the controller adjusts a frequency of operation for the first antenna module by changeably coupling the antenna elements based on the signal quality of the first signal.

The portable communication device may further include a second antenna module that includes a plurality of antenna elements. For example, the receiver may be communicatively coupled to the second antenna module to receive a second signal. The controller may monitor a signal quality of the second signal and adjusts a frequency of operation for the second antenna module by changeably coupling the antenna elements of the second antenna module based on the signal quality of the second signal.

The receiver may include a first receiver module coupled to the first antenna module and a second receiver module coupled to the second antenna module. For example, the controller may monitor the first receiver module to determine the signal quality of the first signal. The controller may monitor the second receiver module to determine the signal quality of the second signal. In this regard, the controller may compare the signal quality of the first signal to the signal quality of the second signal to determine which of the first and second signals to process.

The controller may include a software module that controls the changeable coupling of the antenna elements. Alternatively or additionally, the controller may include a software module that directs the controller to generate a control signal for controlling a reception parameter. For example, the portable communication device may further include a resonant network. In this regard, the reception parameter may be a frequency of reception, a bandwidth, or a combination thereof in the control signal may be a pulse width modulated signal that tunes a resonant network to the frequency of reception. The resonant network may include a varactor diode such that the pulse width modulated signal changes a capacitance of the varactor diode to tune the frequency of reception.

The portable communication device may further include a filter coupled between the controller and the resonant network to filter the pulse width modulated signal. Additionally, the portable communication device may include an amplifier. For example, the reception parameter may be a signal gain and the control signal may be a pulse width modulated signal that controls gain of the amplifier. The portable communication device may also include a filter coupled between the controller and the amplifier to filter the pulse width modulated signal. The amplifier may be a low noise amplifier that is digitally controlled by the pulse width modulated signal.

In one embodiment, a method of configuring a frequency band of reception includes receiving a radio signal with an antenna module, monitoring the received radio signal to determine a signal quality of the radio signal, and generating a first control signal when the signal quality of the radio signal does not correspond to a threshold level of signal quality. The method also includes operating a switch, based on the first control signal, to couple a first antenna element to a second antenna element of the antenna module to lower a frequency of reception for the antenna module.

The method may further include tuning the frequency of reception by generating a second control signal to change a frequency parameter of a resonant network. The second control signal may be a pulse width modulated signal. The method may further include controlling gain of the received radio signal by generating a second control signal to change a gain parameter of an amplifier. The amplifier may be a low noise amplifier. The method may further include operating another switch, based on the control signal, to couple a third antenna element to the second antenna element to further lower the frequency of reception for the antenna module.

In addition to the exemplary aspects and embodiments described above, further aspects and embodiments will become apparent by reference to the drawings and by study of the following descriptions.

BRIEF DESCRIPTION OF THE DRAWINGS

Exemplary embodiments are illustrated in referenced figures of the drawings. It is intended that the embodiments and figures disclosed herein be considered illustrative rather than limiting.

DETAILED DESCRIPTION OF THE DRAWINGS

Reference will now be made to the accompanying drawings, which assist in illustrating the various pertinent features of the present invention. Although the present invention will now be described primarily in conjunction with an antenna for use with portable wireless electronics, it should be expressly understood that the present invention may be applicable to other applications where it is desired to communicate using multiple frequencies and/or communication types. In this regard, the following description of a wideband antenna with switchable antenna elements is presented for purposes of illustration and description. Furthermore, the description is not intended to limit the invention to the form disclosed herein. Consequently, variations and modifications commensurate with the following teachings, and skill and knowledge of the relevant art, are within the scope of the present invention. The embodiments described herein are further intended to explain modes known of practicing the invention and to enable others skilled in the art to utilize the invention in such, or other embodiments and with various modifications required by the particular application(s) or use(s) of the present invention.

Figure 1:
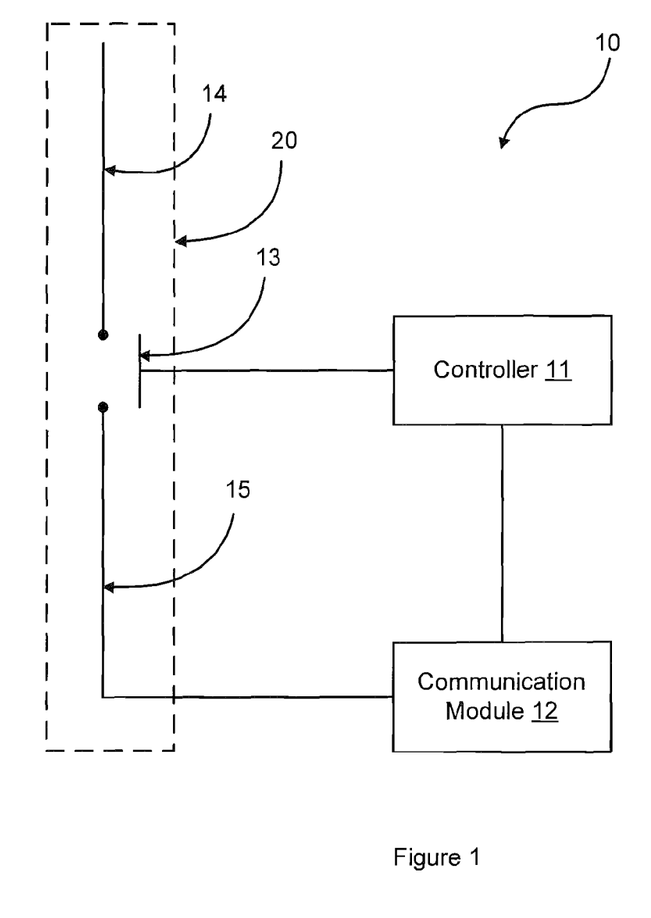
FIG. 1 is a block diagram of communication system with switchable antenna elements.

FIG. 1 is a block diagram of a communication system 10 with switchable antenna elements 14 and 15. In this embodiment, the communication system 10 is configured with a communication module 12 (e.g., a transceiver) that uses the antenna module 20 for communication of radio frequency signals. The antenna module is configured with the antenna elements 14 and 15 to change the frequency coverage of the antenna module. For example, the antenna element 15 may provide specific frequency coverage for the antenna module 20 that, when extended by the antenna element 14, changes that frequency coverage such that the antenna module 20 covers lower frequencies. In this regard, the communication module 12 may transmit and/or receive radio signals within a certain frequency range via the antenna element 15. The communication system 10 is configured with a controller 11 that monitors the signal quality of the radio signals of the communication module 12. The controller 11 may determine when communications can be improved by switching to another frequency band. The controller 11 may monitor the communication module 12 to determine when a received radio signal has degraded beyond some predetermined threshold. The controller 11 may determine that communications can be improved by switching to another frequency band. The controller 11 may then generate a control signal that operates to close a switch 13 and thereby connect the antenna element 14 with the antenna element 15. Accordingly, the overall antenna length for the antenna module 20 increases and the frequency band of communications for the antenna module 20 decreases. That is, the combined antenna length of the antenna elements 14 and 15 will enable the communication system 10 to communicate at lower frequencies.

Although shown and described with respect to the communication module 12 switching from a higher frequency band to a lower frequency band when communications degrade, the invention is not intended to be limited to such frequency/antenna control. Rather, the controller 11 may also switch from lower frequency bands to higher frequency bands by decoupling the antenna element 14 from the antenna element 15. Additionally, the controller 11 may be a control software module configured to operate with a microprocessor. In this regard, the controller 11 may analyze communications of the communication module 12 and quickly switch between antenna lengths as needed. Moreover, invention should not be limited to the number of antenna elements shown with communication system 10. Rather, other embodiments, such as those described below, may include more antenna elements.

Figure 2:
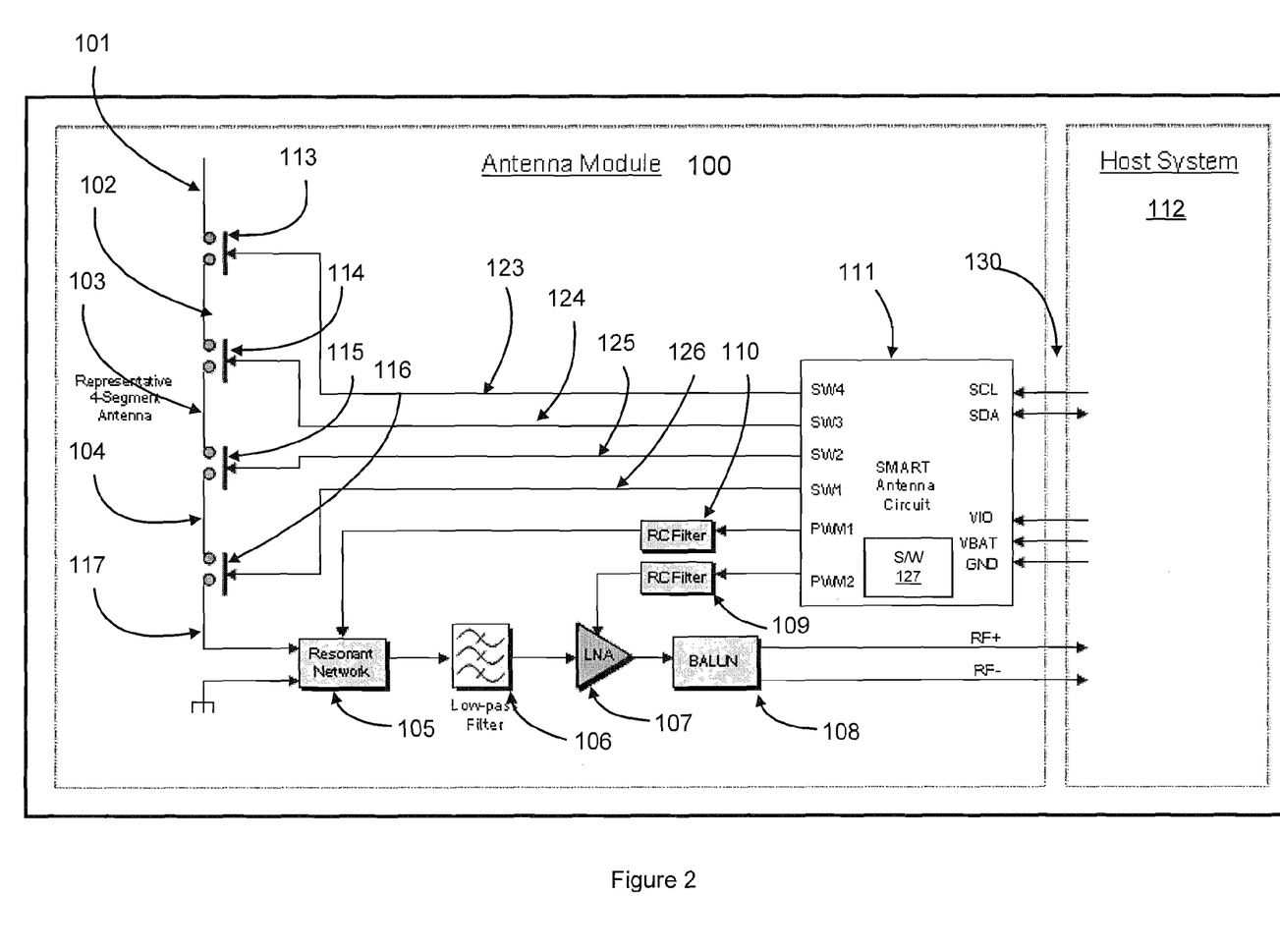
FIG. 2 is another block diagram of an antenna module with switchable antenna elements.

FIG. 2 is a block diagram of an antenna module 100 with switchable antenna elements 101, 102, 103, 104, 117. An antenna module 100 may generically provide optimal frequency control features for a host system 112. For example, the host system 112 may be a mobile handset, such as a Global System for Mobile communication ("GSM") cellular telephone or a Code Division Multiple Access ("CDMA") cellular telephone, or any other suitable portable device (e.g., Personal Digital Assistant, a portable DVD, etc.). In this regard, the host system 112 may require certain frequency ranges within the radio frequency ("RF") spectrum for transmission and/or reception of communication signals. That is, frequency ranges are generally specific to a particular form of communication, such as GSM or CDMA, as licensed by the Federal Communications Commission and/or other radio spectrum regulating agencies. Additionally, such communication typically requires a certain level of gain and/or band limiting of interference. The antenna module 100 may provide such gain control and band limiting to a range of frequencies and, thus, a plurality of different communication types.

As shown in this embodiment, the antenna module 100 includes the switchable antenna elements 101 through 104. Antenna elements 101 through 104 are "switched in" or "switched out" according to a desired frequency range for the host system 112. As discussed above, the physical length of an antenna often dictates the frequency reception/transmission capabilities of the antenna (e.g., longer antennas provide greater reception/transmission capabilities for longer RF wavelengths than shorter antennas). In this regard, the antenna module 100 may change the effective physical length of the antenna by switching in or switching out individual antenna elements from the antenna module 100. The antenna base element 117 itself may provide a first antenna length for the antenna module 100. A switch 116 may couple the antenna element 104 to antenna base element 117 to create a second antenna length for the antenna module 100. Similarly, a switch 115 may couple the antenna element 103 to the antenna element 104 to create a third the antenna length for the antenna module 100, and so on. Accordingly, when the switches 113, 114, 115, and 116 are closed, the antenna elements 101, 102, 103, and 104 are coupled to antenna base element 117.

To provide switching of the antenna elements 101 through 104, the antenna module 100 includes a controller 111. The controller 111 interfaces with the host system 112 and provides control over the antenna elements 101 through 104. That is, the controller 111 may provide control signals over the lines 123 through 126 to respectively operate the switches 113 through 116. In this regard, the controller 111 may include control software 127 that directs the controller 111 to generate such control signals and thereby control the operation of the switches 101 through 104. For example, the controller 111, under software control from the host system 112, may switch antenna segments in and out to provide the best overall length for a selected frequency. In this regard, the host system 112 may transfer a control signal to the controller 111. The control signal may include a software parameter that directs the software 127 to switch the antenna segments 101, 102, 103, 104, and 117. This is generally referred to as coarse antenna adjustment.

Although shown as being configured with the antenna module 100, those skilled in the art should readily recognize that the controller 111 may be implemented in other manners. In one embodiment, the controller 111 may instead be a module configured with the host system 112 rather than a separate interfacing controller with the host system 112. For example, the host system 112 may be a cellular telephone having processor functionality capable of implementing the control software 127 to provide antenna control of the antenna elements 101 through 104 via the switches 113 through 116. In another embodiment, the controller 111 is implemented with an "off the shelf" circuit for generating Pulse Width Modulation (PWM) and logic signals or with a custom circuit (e.g., a single chip, such as an Application-specific Integrated Circuit, or "ASIC") that is programmable via an interface with host system 112 (e.g., I$^2$C bus, serial bus, single wire communications, or any other suitable communication interface). As such, the invention is not intended to be limited to the embodiment shown and described herein. Additionally, the registers of such a circuit would typically be read/write ("R/W"). Such a circuit may also include a ROM space to, for example, allow for a unique device ID.

The antenna module 100 may also include a resonant network 105 to improve frequency characteristics of the antenna module. For example, the resonant network 105 may provide fine tuning capabilities for the antenna module 100. The resonant network 105 may be software controlled via a programmable PWM output that controls a tunable circuit (e.g. a varactor diode). In this regard, the controller 111 may fine tune the desired frequency and/or limit the band pass of the resonant network 105 to the required bandwidth (e.g., 10 MHz), thereby providing optimal reception/transmission capabilities for communications, such as GSM or CDMA.

Figure 5:
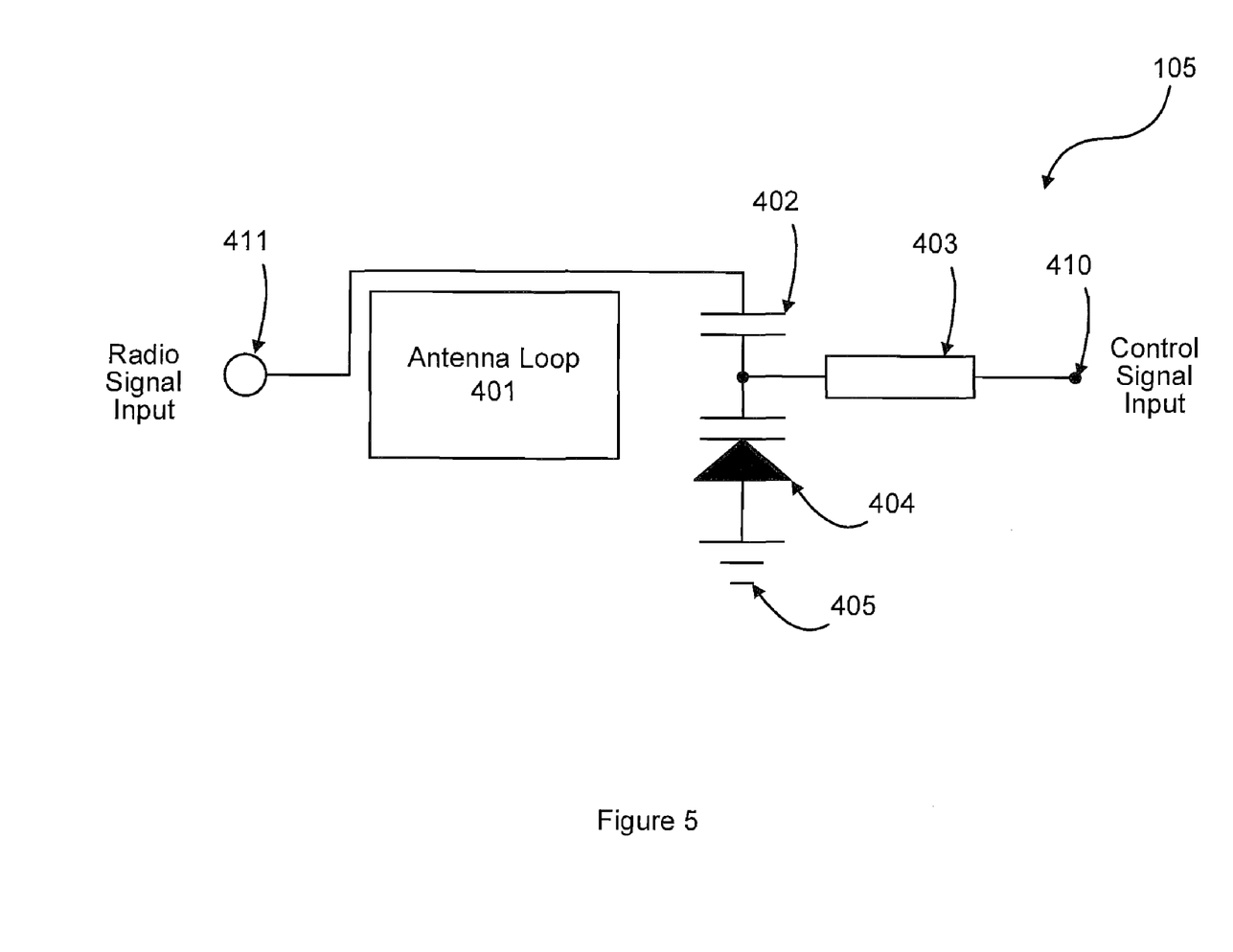
FIG. 5 is a circuit diagram of a resonant network.

The tuned/band-limited RF from the resonant network 105 may be application-specific and therefore subsequently processable by many types of host systems for extraction of communication data therefrom (e.g., voice, data, and/or video). Additionally, the resonant network 105 may be used for fine tuning the selected frequency and is generally software controlled via a programmable Pulse Width Modulation (PWM) output that controls a tunable circuit (e.g. a varactor diode). In this regard, the controller 111 may fine tune the desired frequency and/or limit the band pass to the required bandwidth (e.g., 10 MHz). An example of the resonant network 105 is shown in FIG. 5.

The antenna module 100 may also include a filter 110 to essentially provide DC control of the resonant network 105 via PWM. That is, controller 111 may generate a digital signal that is pulse width modulated. The filter 110 may smooth that PWM signal to generate a continuous DC signal having a voltage that changes with respect to the PWM signal. Those skilled in the art are readily familiar with such digital control. Alternative techniques may be used including a digital to analog ("D/A") converter.

In one embodiment, the resonant network 105 includes a variable capacitance. For example, the resonant network 105 may employ a varactor diode to provide relatively quick tuning capabilities by changing the capacitance associated with the switch and antenna elements (i.e., the antenna elements 101, 102, 103, and/or 104). In this regard, the filtered PWM signal from the filter 110 may change in voltage to change the capacitance of the varactor diode and thereby "tune" the antenna module 100.

Typically, varactor diodes are operated in their reverse-bias region where no current flows. Since the width of the depletion zone of a varactor diode varies with the applied bias voltage, the capacitance of the diode can be made to vary. Generally, the depletion region width is proportional to the square root of the applied voltage and the capacitance is inversely proportional to the depletion region width. The capacitance, therefore, is inversely proportional to the square root of applied voltage.

In one embodiment, the antenna module 100 includes a varactor diode by Agile Materials, Inc. of Goleta, Calif., which may provide improved linear performance when compared to other varactor diodes. For example, the capacitance of the Agile Materials varactor diode may change more linearly with respect to a bias voltage applied to the diode. As such, the Agile Materials diode may have better tuning control. This improved tuning control may also decrease software complexity. For example, linear functions are typically easier to control than nonlinear functions. As such, software control of the PWM signal used to operate the Agile Materials varactor diode may be simpler. In one embodiment, the effective tuning range is about 500 MHz. In another embodiment, the effective tuning range is between about 400 MHz and 800 MHz. The tuning may be implemented by supplying an effective voltage (e.g., via the PWM signal) within a range between about 0 volts and 5 volts.

The varactor diodes from Agile Materials may provide other advantages. For example, in addition to the linear performance, the Agile Materials varactor diode may provide performance over a wide range of temperatures. That is, the Agile Materials varactor diode may provide better linear performance than other varactor diodes while doing so at a substantially wide range of temperatures. Such may be advantageous for handset operations and/or automotive applications where operating temperatures are often higher.

However, the invention is not intended to be limited to a varactor diode as other types of varactors may be used. For example, in Complementary Metal Oxide Semiconductor ("CMOS") processes, varactors can be formed by placing a heavily positively-doped region (i.e., a P$^+$ implant) inside a lightly positively-doped region. The capacitance of these junctions, as such, behaves similarly to that of an N-Channel Metal Oxide Semiconductor Field Effect Transistor ("MOSFET").

In addition to the control features of tuning and bandwidth limiting via the control of antenna element selection and/or variable capacitance of the resonant network 105 (e.g., via the varactor diode), the antenna module 100 may employ other signal conditioning components. For example, the antenna module 100 may include filter 106 to provide additional bandwidth limiting features of the RF. In one embodiment, the filter 106 is a Surface Acoustic Wave ("SAW") filter providing a low pass band region (i.e., an low pass filter, or "LPF") that passes frequencies of about 698 MHz and below. Such a filter would enable coverage of UHF television signals in the UHF III, IV and V frequency bands. Additionally, the filter 106 may be used to meet the Mobile and Portable DVB-T Radio Access Interface (MBRAI) class 3 DVB-H device specifications with low GSM and CDMA bands.

Additionally, the antenna module 100 may include an amplifier 107 to boost the gain of RF from the resonant network 105. In one embodiment, the amplifier 107 is a low noise amplifier ("LNA") that is digitally controlled by controller 111. The controller 111 may generate a PWM signal which is filtered by the filter 109 to provide a DC control of the amplifier 107. The amount of gain can be controlled to further improve the linearity of the antenna module 100 output across the frequency spectrum. The amplifier 107 of this embodiment may also be used to overcome insertion losses of the downstream devices (e.g., the balun 108) as well as losses associated with the filter 106. The balun 108 may provide a balanced output to a tuner (e.g., a tuner configured with the host system 112) to minimize negative signal routing effects.

As described hereinabove, the control functionality of the controller 111 may be incorporated with the host system 112 to take advantage of already present processing capabilities within the host system. In this regard, the host system 112 may use the controller 111 to optimize reception/transmission capabilities. For example, the host system 112 may receive communication data and perform various Error Detection and Correction ("EDAC") schemes on that received data. Based on detected error rates, the host system 112 may direct controller 111 to switch in or switch out the antenna elements 101 through 104 and/or direct controller 111 to change capacitance of the resonant network 105 to improve the gain of the received signal and thereby decrease error rates. Additionally, the host system 112 may direct the controller 111 to control the amplifier 107 to improve the gain of the received signal and, thus, error rates.

In one embodiment, an interface 130 is configured between the host system 112 and the antenna module 100. The interface 130 may include a differential antenna signal (e.g., via the balun 108), a 2-wire serial control bus (e.g., an I$^2$C bus having SCL and SDA lines), an unswitched battery (i.e., VBAT), or a switched 2.8V supply (e.g., operating power). The interface may also include VIO port to select the input/output (I/O) voltage for the serial control bus. The interface 130 may also include a GND port to provide a ground potential. These ports may be configured with the interface 130 so that the antenna module 100 may be molded as a single unit as is often required by various platforms. For example, circuits on the antenna module 100 may be configured in die form to minimize "footprint" (e.g., Chip-On-Board or Flip-Chip-Assembly).

In one embodiment, the controller 111 may include calibration features used to calibrate various tuning and/or bandwidth limiting aspects of the antenna module 100. For example, the software 127 may include signal gain tables that are used to detect diminishing characteristics of various components within the antenna module 100. That is, the controller 111 may access a signal gain table to determine, under given circumstances, what a signal strength should be. The controller 111 may therefore determine whether the signal strength of a received signal is adequate within values of the signal gain table. If not, the controller 111 may adjust control features, such as the capacitance of the resonant network 105 and/or the gain of the amplifier 107, to restore the gain of a received signal to optimal levels. In one embodiment, the controller 111 incorporates a "smart auto-calibrate" capability in the control algorithm, the results of which are stored in look-up tables. Such may provide a "one-time" calibrate and lock at the time of assembly.

Although one embodiment has been shown and described herein, those skilled in the art should readily recognize that the invention is not intended to be limited to the illustrated embodiment. Rather, the antenna module 100 may be implemented in other ways that fall within the scope and spirit of the invention. For example, certain components, such as the amplifier 107, the filter 106, and/or the balun 108 may be optional or implemented in other ways (e.g., the filter 106 may be a tunable bandpass filter). Additionally, the invention is not intended to be limited to the number of antenna elements or switches shown and described herein. For example, switching may be performed by a multiplexer rather than individual switch elements 113 through 116 to control virtually any number of antenna elements. In this regard, a larger number of shorter antenna elements may provide a more discretized frequency selection for host system 112.

In one embodiment, the switch elements 113 through 116 are Micro Electro-Mechanical Systems ("MEMS"). For example, MEMS devices generally refer to mechanical components on the micrometer size and include 3D lithographic features of various geometries. Such devices are typically manufactured using planar processing similar to semiconductor processes such as surface micromachining and/or bulk micromachining. These devices generally range in size from a micrometer to a millimeter. However, those skilled in the art should readily recognize that the invention is not intended to be limited to a particular type of switch control. Other types of switches may be used, particularly those with high frequency operations. In one embodiment, the antenna elements 101 through 104 are constructed of copper on a ceramic substrate and are controllably connected via operation of MEMS switches.

Figure 3:
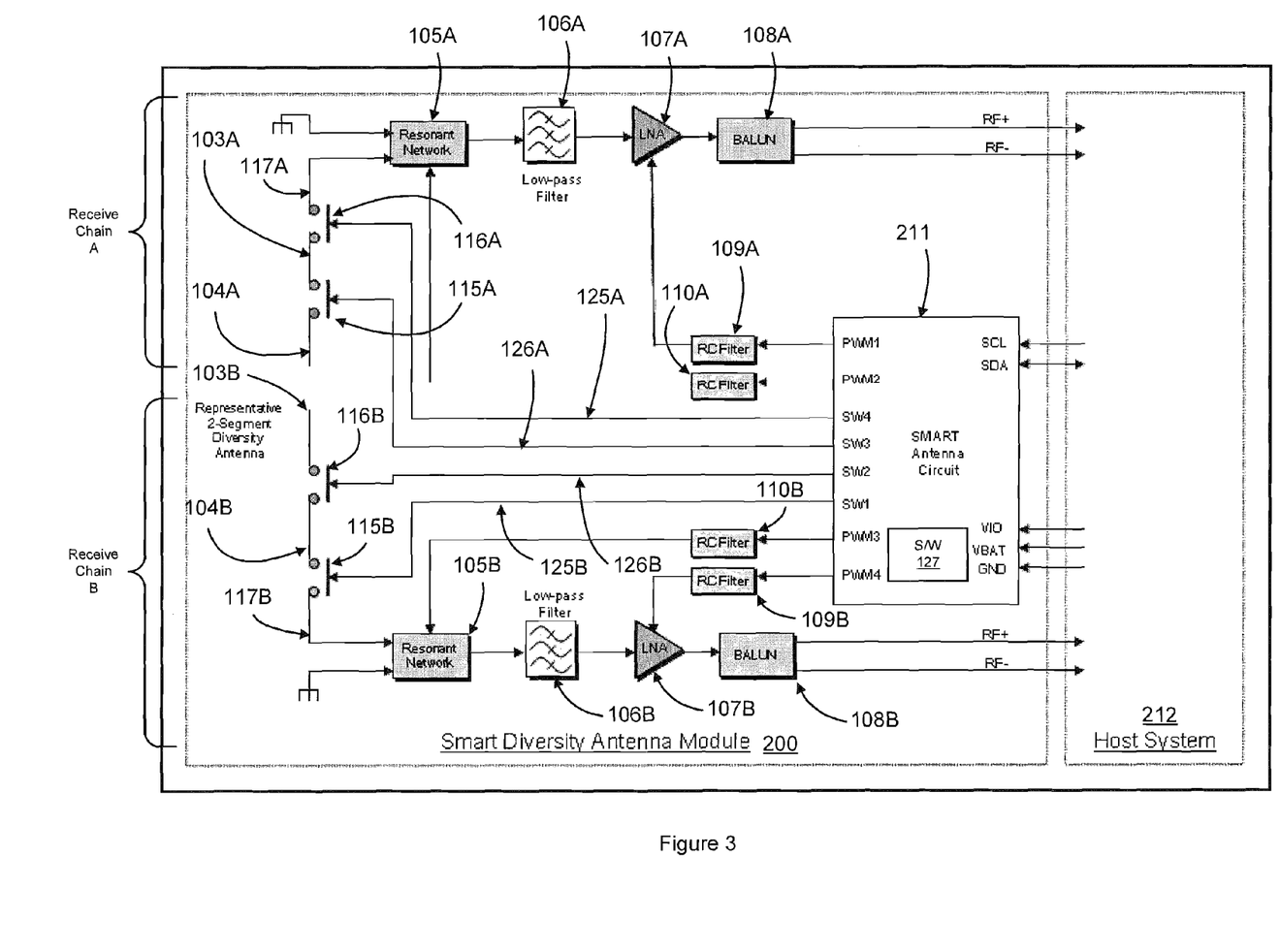
FIG. 3 is a block diagram of an antenna module with switchable antenna elements employing antenna diversity.

FIG. 3 is a block diagram of an antenna module 200 using switchable antenna elements and employing antenna diversity. For example, the antenna module 200 is illustrated with the receive chains A and B. The use of the receive chains A and B enables a receiver, such as the host system 212, to select or combine the receive chains to improve signal quality of a received signal. In some instances, such as CDMA cellular telephony, receive chains compensate and even take advantage of multipath fading with a signal. Receive diversity further assists in this endeavor by giving a receiver the choice of multiple signals to process (e.g., the signal from the receive chain A, the signal from the receive chain B, or a combination thereof). That is, multiple receive chains may improve gain of a received signal because one or more of the receive chains is in a better physical position to receive the signal.

The antenna module 200 employs the various tuning and bandwidth limiting features shown and described in FIG. 1 with each receive chain. In this embodiment, the receive chains A and B use the same tuning, bandwidth limiting, and signal conditioning components. As such, it is only necessary to describe one receive chain. However, the invention is not intended to be limited to identical receive chains. Rather, those skilled in the art should readily recognize that receive chains may be configured in other ways, including those in which receive chains are different from one another, to take advantage of design (e.g., size, component selection, circuit board layout, etc.) and/or reception considerations. As with antenna module 100 of FIG. 1, the receive chain A may include signal conditioning components, such as the filter 106A, amplifier 107A (and its associated filter 109A for PWM control), and/or the balun 108A.

In this embodiment, the receive chain A is configured with the antenna elements 104A and 103A. The antenna elements 104A and 103A may be configured as either di-pole or mono-pole antenna elements. The antenna elements 104A and 103A may be controllably switched by the controller 211 generating control signals that are transferred to the switches 116A and 115A via the control lines 126A and 125A. In this regard, the controller 211 may switch in or switch out the antenna elements 103A and 104A to the antenna base element 117A. As such, the frequency range of the receive chain A may be controlled through the selection of the antenna elements 103A and 104A. Additionally, the controller 211 may generate a PWM signal to control the resonant network 105A by, e.g., changing capacitance of the network and thus the tuning characteristics of the receive chain A.

The various features described hereinabove may be used in a plurality of devices. In particular, these features may be advantageously used in cell phones, portable media players, personal digital assistants (PDAs), automotive and other applications where a wide band, frequency agile antenna is required, including digital and analog broadcast TV and broadcast radio. For example, the above antenna modules may be used with a digital video broadcasting (DVB) TV antenna for cell phone applications using the DVB-H standard. However, these features may be used with other standards, such as the DVB-T standard. Other implementations may include WiFi, WAN, WLAN, PAN, GPS and/or other various communications schemes.

By abstracting the software and hardware components and placing intelligence on the antenna module, the task of implementing a tunable antenna may be dramatically simplified. For example, a host system can simply detect which module is installed and automatically configure operation for that particular module. In addition, the software can periodically calibrate the antenna to overcome the effects of aging components.

Figure 4:
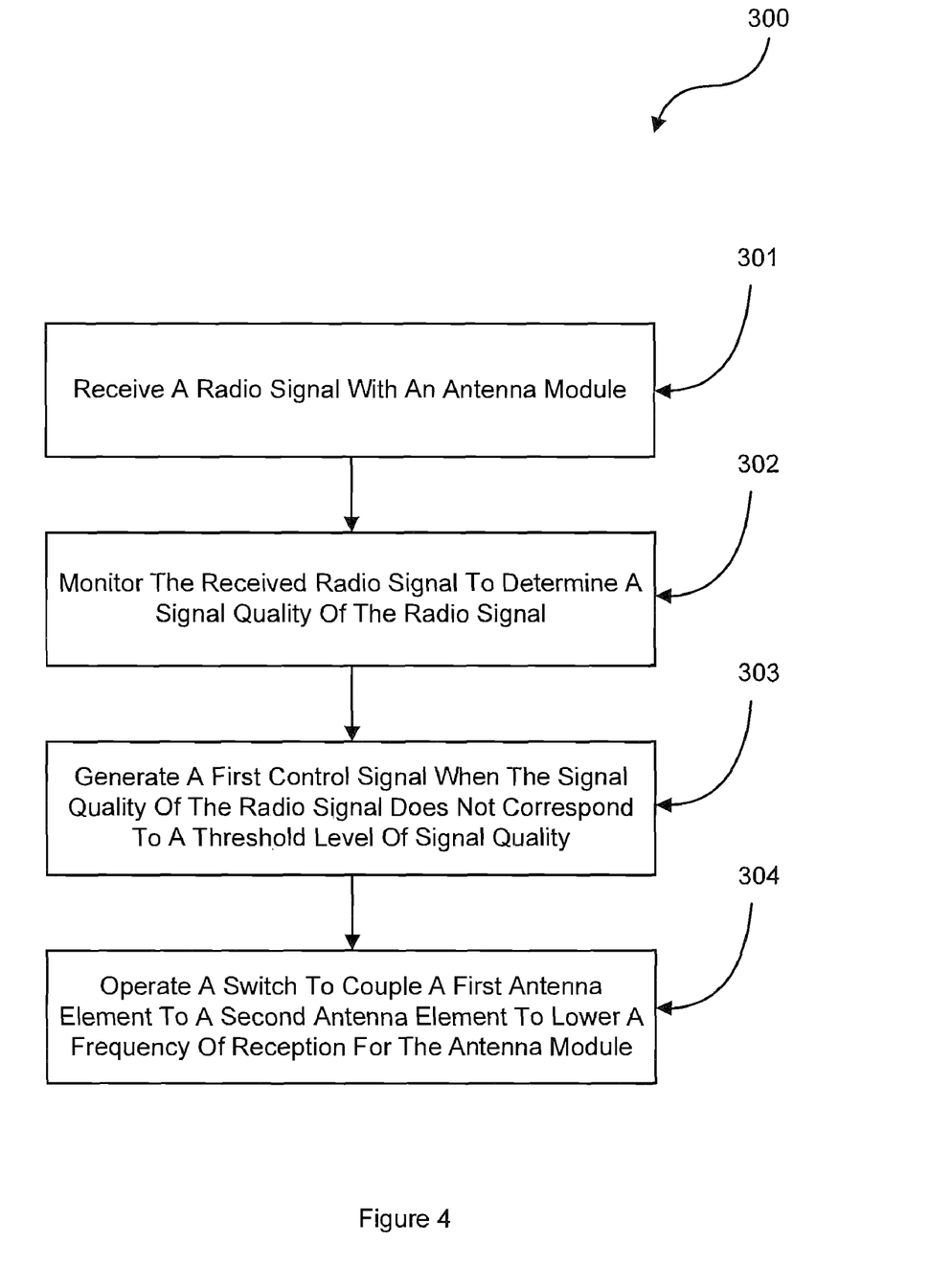
FIG. 4 is a flowchart illustrating a process for an antenna with switchable antenna elements.

FIG. 4 is a flowchart illustrating a process 300 for an antenna (e.g., antenna module 20 of FIG. 1) with switchable antenna elements (e.g., antenna elements 14 and 15 of FIG. 1). Process 300 generally begins with a radio signal being received by an antenna module, in process element 301. For example, the antenna module may be configured with a mobile handset, such as a cell phone or a PDA, for wireless communications. In this regard, the antenna module may receive a radio signal via a receiver configured with the mobile handset. In process element 302, the received radio signal is monitored to determine a signal quality of the radio signal. In one embodiment, a controller, such as controller 111 of FIG. 2, compares the signal quality of the radio signal to a predetermined threshold of signal quality. For example, the controller may monitor the error rate of the received signal and compare that error rate to a deemed acceptable error rate value.

In response to determining the signal quality of the received radio signal, the controller may generate a control signal when the signal quality of the received radio signal does not correspond to the threshold level of signal quality (e.g., the error correction is lower than a predetermined level), in process element 303. The control signal may operate a switch that couples an antenna element to another antenna element to thereby lower a frequency of reception for the antenna module, in process element 304. For example, the longer antenna formed by the coupling of two antenna elements may lower the frequency of operation for the mobile handset. By switching the antenna module to a lower frequency of reception, the mobile handset can change frequency bands when, e.g., interference in one band degrades a signal beyond an acceptable limit.

FIG. 5 is a circuit diagram of the resonant network 105 that may be used with the antenna modules described hereinabove. In this embodiment, the resonant network 105 includes a radio signal input 411 and is configured for receiving a radio frequency signal. In this regard, the radio signal input 411 may be coupled to the base antenna element 117 to receive a radio signal via the selected couplings of antenna elements (e.g., antenna elements 117 and 101-104). The radio signal may be transferred about an antenna loop 401. For example, the antenna loop 401 may be an inductive coupling (e.g., a magnetic coupling) that changes the frequency characteristics of the radio signal (e.g., band limits) in conjunction with the control imposed by a DC control signal asserted at the control signal input 410. In this regard, a controller (e.g., controller 111) may transfer a pulse width modulated signal to the control signal input 410 to tune the frequency characteristics of the resonant network 105. The pulse width modulated signal may do so by changing the capacitance of the varactor diode 404 (coupled to the ground reference 405). That is, the inductive coupling of the antenna loop 401 together with the tuning of the varactor diode 404 by the control signal may form a resonance circuit that can be tuned to a desired frequency. Also included in this embodiment is the RF decoupling element 403. One example of the RF decoupling element 403 includes a resistor that, when the value of the resistance is changed, the bandwidth of the input radio signal may also change. The RF decoupling element 403 assists in preventing RF signals from being applied to the DC input. The resonant circuit 105 also includes a capacitor 402 that is used to decouple the DC signal introduced at the control signal input 410 (i.e., the pulse width modulated signal) from the radio signal to similarly prevent DC signals from being applied to RF signals.

While the embodiments shown and described herein generally refer to communications as being the reception of radio signals, those skilled in the art should readily recognize that the invention is not intended to be limited to merely radio reception. Rather, the antenna switching agility of the above embodiments may also enable a device to transmit at other frequencies when, e.g., one transmission frequency degrades beyond an acceptable limit.

It should be understood that the particular antenna element configurations (e.g., the number of antenna elements) described herein could be varied to achieve the same or similar objectives. In this regard, the foregoing description has been presented for purposes of illustration and description. Furthermore, the description is not intended to limit the invention to the form disclosed herein. While a number of exemplary aspects and embodiments have been discussed above, those of skill in the art will recognize certain variations, modifications, permutations, additions, and sub-combinations thereof. It is therefore intended that the following appended claims and claims hereafter introduced are interpreted to include all such variations, modifications, permutations, additions, and sub-combinations as are within their true spirit and scope.

What is claimed is:

1. A system for controlling a frequency of operation for a communication device, including:
   a first antenna module that includes a plurality of antenna elements;
   a first set of one or more switches configured to selectively couple at least two of the plurality of antenna elements of the first antenna module together such that an effective length of the first antenna module is selectively adjustable;
   a second antenna module that includes a plurality of antenna elements; and
   a second set of one or more switches configured to selectively couple at least two of the plurality of antenna elements of the second antenna module together such that an effective length of the second antenna module is selectively adjustable; and
   a controller communicatively coupled to the first and second set of one or more switches, wherein the controller is operative to generate switch control signals to control the switches to selectively vary the effective length of the first and second antenna modules.

2. The system of claim 1, wherein at least one of the first and second antenna modules includes one more antenna element than a total number switches.

3. The system of claim 1, further including a communication module coupled to the first and second antenna modules to communicate via at least one of the plurality of the antenna elements.

4. The system of claim 3, wherein the controller is configured with the communication module.

5. The system of claim 1, wherein the controller includes a software module that directs a microprocessor to generate the switch control signals.

6. The system of claim 1, wherein the one or more switches of the first and second set include a multiplexer.

7. The system of claim 1, wherein the communication device that the system controls a frequency of operation of includes a receiver that receives a signal from at least one of the first and second antenna modules.

8. The system of claim 7, wherein the receiver includes a reception parameter associated therewith and wherein the controller includes a software module that directs the controller to generate a reception control signal for controlling the reception parameter.

9. The system of claim 8, further including a resonant network, wherein the reception parameter is a frequency of reception, a bandwidth, or a combination thereof, and wherein the reception control signal is a pulse width modulated signal that tunes a resonant network to the frequency of reception.

10. The system of claim 9, wherein the resonant network includes a varactor diode, wherein the pulse width modulated signal changes a capacitance of the varactor diode to tune the frequency of reception.

11. The system of claim 9, further including a filter coupled between the controller and the resonant network to filter the pulse width modulated signal.

12. The system of claim 8, further including an amplifier, wherein the reception parameter is a signal gain and wherein the reception control signal is a pulse width modulated signal that controls gain of the amplifier.

13. The system of claim 12, further including a filter coupled between the controller and the amplifier to filter the pulse width modulated signal.

14. The system of claim 13, wherein the amplifier is a low noise amplifier that is digitally controlled by the pulse width modulated signal.

15. The system of claim 1, wherein the plurality of antenna elements of the first and second antenna modules include monopole antenna elements.

16. The system of claim 1, wherein the plurality of antenna elements of the first and second antenna modules include dipole antenna elements.

17. The system of claim 1, wherein the controller is operative to monitor a signal quality, and in response, to adjust a frequency operation of at least one of the first and second antenna modules by selectively generating the switch control signals to control the one or more switches of the first and second set to selectively vary the effective length of the first and second antenna modules.

18. The system of claim 1, wherein the signal quality includes an error rate.

* * * * *